C. SVENZEN.
Harrows.

No. 143,941.  Patented Oct. 21, 1873.

ATTEST:
H. S. Sprague
H. T. Eberts

INVENTOR:
Christian Svenzen
Per Atty
Thos. S. Sprague

UNITED STATES PATENT OFFICE.

CHRISTIAN SVENZEN, OF BLAIR, NEBRASKA.

IMPROVEMENT IN HARROWS.

Specification forming part of Letters Patent No. 143,941, dated October 21, 1873; application filed February 26, 1872.

*To all whom it may concern:*

Be it known that I, CHRISTIAN SVENZEN, of Blair, in the county of Washington and State of Nebraska, have invented a new and useful Improvement in Rotary Harrows; and I do declare that the following is a true and accurate description thereof, reference being had to the accompanying drawing forming a part of this specification, in which—

Figure 1:
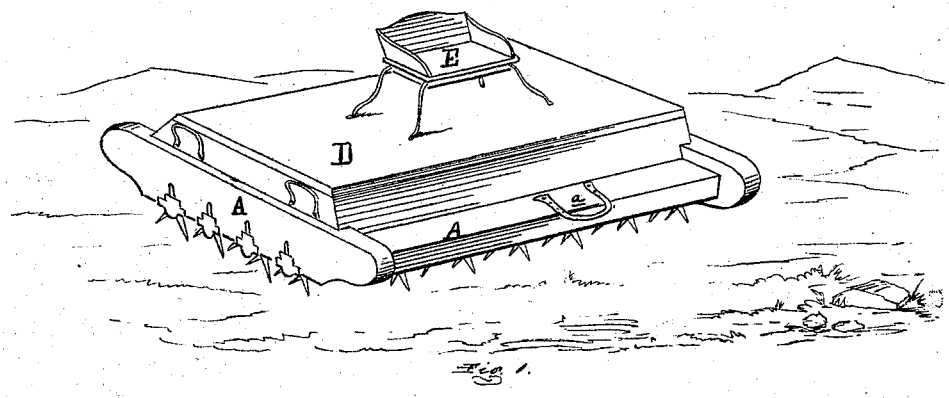
Figure 2:
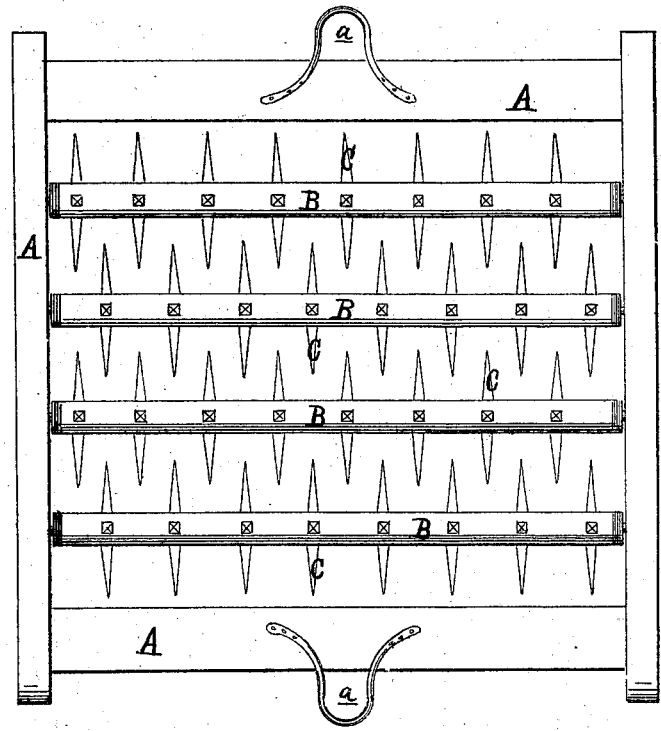

Figure 1 is a perspective view of my improved harrow; and Fig. 2 is a plan view with the cover removed.

Similar letters of reference indicate corresponding parts in the several figures.

The nature of my invention relates to an improvement in the side pieces or runners in that class of harrows which consist of a series of shafts armed with harrow-teeth, revolving in a frame; and it consists in so constructing the side pieces of the frame that the harrow may slide over stones, stumps of trees, or other obstructions in the ground, and by this means be made to operate more easily and with less risk of breakage than harrows of the same class as ordinarily constructed.

In the drawing, A represents a rectangular frame, the side pieces of which, as seen in Fig. 1, are deeper than the front pieces and project downwardly close to the ground. These side pieces or runners are provided with suitable boxes on the inside, in which are journaled the rotating shafts B armed with straight harrow-teeth, C, which said teeth interlock with each other. The front pieces are each provided with a clevis, *a*, or its equivalent, by which the harrow may be drawn by the team. Said harrow, as is well known, thoroughly pulverizes the ground and leaves it in a high state of tilth; but in this class of harrows it is desirable to provide for simple and easy means by which the harrow may be drawn forward or backward, at the will of the operator, without the necessity of reversing the harrow or turning it upside down, and at the same time enable it to slide easily over stones and similar obstructions in the ground. This I accomplish by shaping the runners in the peculiar manner shown in the drawing, viz., first rounding the forward and rear ends thereof, and then gradually sloping them downward to the lower side of said runners. By this shape, in combination with the arrangement of the rotary shafts— viz., so that only a small portion of the teeth projects below said runners—I am enabled to produce a harrow which can be used with advantage on soil of a character which does not well admit of being operated upon by harrows differently constructed. D is a box-like cover, which is made to rest on the runners, as shown in the drawing. On the center of this cover a seat-standard is secured, and is surmounted by a seat, E, which the driver may occupy, rendering the use of the pulverizer much less fatiguing than if he were compelled to walk. This box or cover is removable, and may be lifted off the harrow. When it is desired to take this to or from the field it may reversed, so that the teeth will not come in contact with the ground, and the cover may be placed on top of the projecting points of the harrow-teeth, while the driver rides home seated on the seat E.

What I claim as my improvement, and desire to secure by Letters Patent, is—

The reversible harrow, as described, consisting of the rounded runners and connecting-bars, the toothed cylinders, the seat and removable cover, the cylinders being journaled at the upper edge of the runners to prevent the teeth coming in contact with the ground when reversed.

CHRISTIAN SVENZEN.

Witnesses:
M. BALLARD,
W. C. MALLAN.